(12) United States Patent
Wurster

(10) Patent No.: US 11,264,863 B2
(45) Date of Patent: Mar. 1, 2022

(54) ROTOR OF AN ELECTRIC MACHINE AND METHOD FOR PRODUCING SAME

(71) Applicant: Dr. Ing. h.c. F. Porsche Aktiengesellschaft, Stuttgart (DE)

(72) Inventor: Peter Wurster, Kornwestheim (DE)

(73) Assignee: Dr. Ing. h. c. F. Porsche AG, Weissach (DE)

( * ) Notice: Subject to any disclaimer, the term of this patent is extended or adjusted under 35 U.S.C. 154(b) by 78 days.

(21) Appl. No.: 16/859,942

(22) Filed: Apr. 27, 2020

(65) Prior Publication Data
US 2020/0343787 A1    Oct. 29, 2020

(30) Foreign Application Priority Data

Apr. 25, 2019 (DE) ............... 10 2019 110 714.8

(51) Int. Cl.
| H02K 7/04 | (2006.01) |
| H02K 7/08 | (2006.01) |
| H02K 15/16 | (2006.01) |

(52) U.S. Cl.
CPC ............... *H02K 7/04* (2013.01); *H02K 7/083* (2013.01); *H02K 15/165* (2013.01)

(58) Field of Classification Search
CPC ......... H02K 7/04; H02K 7/083; H02K 15/165
USPC .................................................... 310/90, 51
See application file for complete search history.

(56) References Cited

U.S. PATENT DOCUMENTS

| 2005/0025651 A1* | 2/2005 | Sowa ................... F04C 29/0021 418/55.1 |
| 2009/0261678 A1* | 10/2009 | Sortore ................ H02K 1/2753 310/156.31 |
| 2012/0219245 A1* | 8/2012 | McKeirnan, Jr. ..... F16C 35/077 384/473 |

OTHER PUBLICATIONS

Norm ISO 21940-12—Apr. 1, 2016—Mechanical Vibration—rotor balancing—part 12: procedures and tolerances for rotors with flexible behaviour.
Hatto Schneider—Auswuchttechnik, 8 Aufl., 2013, ISBN: 978-3-642-24913-6.
German Search Report dated Dec. 18, 2019.

* cited by examiner

*Primary Examiner* — Terrance L Kenerly
(74) *Attorney, Agent, or Firm* — Gerald E. Hespos; Matthew T. Hespos; Michael J. Porco

(57) ABSTRACT

A rotor (10) of an electric machine has a shaft (11) a laminated core (12) arranged on the shaft (11) and balancing bodies (13) arranged on the shaft (11). The balancing bodies (13) have an aperture (15) situated outside the center of gravity. Each balancing body (13) is mounted by way of the aperture (15) on the shaft (11) of the rotor (10) in a defined angular position. Positioning sleeves (20) are arranged on the shaft (11) to define a distance between bearings (16, 17) of the shaft (11) and the laminated core (12) or the balancing bodies (13) and to provide an anti-rotational safeguard for the balancing bodies (13).

12 Claims, 3 Drawing Sheets

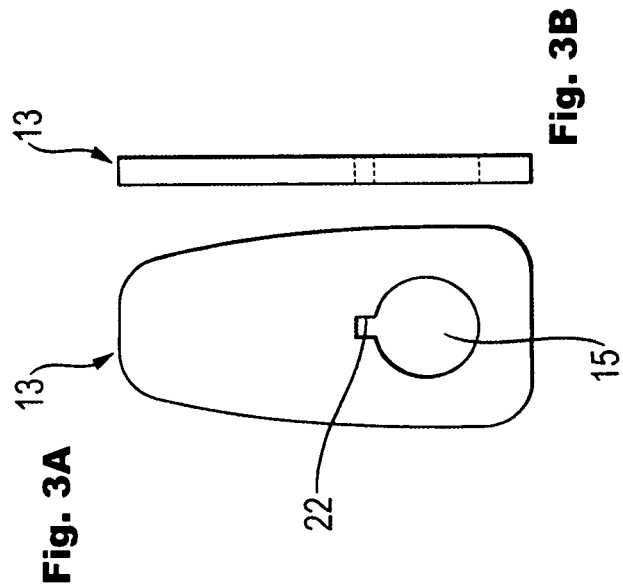
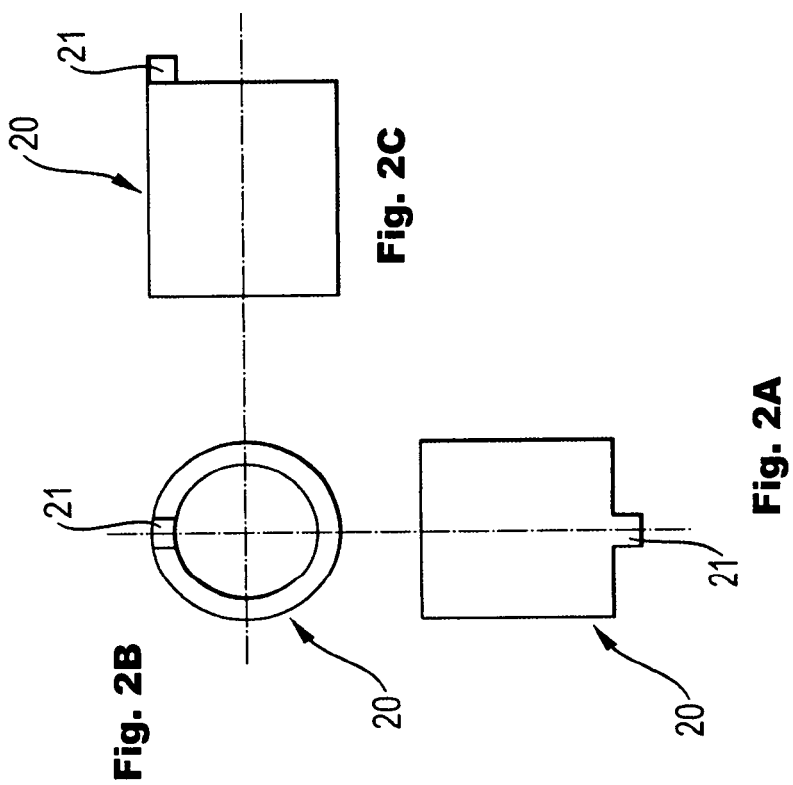

ROTOR OF AN ELECTRIC MACHINE AND METHOD FOR PRODUCING SAME

CROSS REFERENCE TO RELATED APPLICATION

This application claims priority under 35 USC 119 to German Patent Appl. No. 10 2019 110 714.8 filed on Apr. 25, 2019, the entire disclosure of which is incorporated herein by reference.

BACKGROUND

Field of the Invention

The invention relates to a rotor of an electric machine and to a method for producing same.

Related Art

A rotor of an electric machine has a shaft mounted in bearings, a laminated core positioned on the shaft, and magnets positioned in magnet pockets of the laminated core. The magnets form pole pairs. The laminated core of the rotor of an electric machine can take the form of a segmented laminated core made up of laminated core segments positioned next to one another or behind one another, as viewed in the axial direction of the shaft.

Manufacturing deviations in the individual subassemblies of the rotor lead may occur in spite of a symmetrical design of the rotor and result in an imbalance. Unwanted vibrations, noise or premature failure may occur during operation of the electric machine if the imbalance of the rotor exceeds a limit value.

A rotor of an electric machine can be balanced by mass compensation at the rotor to compensate for the imbalance of a rotor. Mass compensation during balancing can be carried out by removal of mass by so-called negative balancing or by addition of mass as so-called positive balancing. Negative balancing also is referred to as subtractive balancing, and positive balancing is also referred to as additive balancing.

Balancing a rotor of an electric machine typically involves negative balancing. However, the damage to the rotor of an electric machine with negative balancing cannot be tolerated for high-power machines.

Therefore, a rotor often will have a sacrificial mass, in addition to the subassemblies of the shaft, the laminated core and the magnets. The sacrificial mass can be removed for negative balancing. Sacrificial masses for negative balancing also are referred to as balancing disks. However, balancing disks have the disadvantages of increasing the overall axial length and the mass of the rotor.

Positive balancing avoids the disadvantages of negative balancing when balancing a rotor of an electric machine. Positive balancing applies material at points on the rotor at which the additional mass is required for minimizing the imbalance. Rotors balanced by positive balancing are lighter than rotors balanced by negative balancing.

The known methods for negative balancing and for positive balancing are unsuitable for rotors of electric machines that are operated at a rotational speed of more than 15,000 rpm or even at a rotational speed of more than 17,000 rpm particularly with respect to industrial manufacture of such rotors within short cycle times.

There is therefore a need for a novel rotor of an electric machine, in particular a quick-running electric machine, that can be produced within short cycle times with small imbalance. The invention further relates to a method for producing such a rotor.

SUMMARY

The rotor according to invention has a shaft and a laminated core on the shaft.

The rotor of the invention further has balancing bodies arranged on the shaft. Each balancing body has an aperture situated outside the center of gravity. Each balancing body is mounted by way of the aperture on the shaft of the rotor in a defined angular position. The respective aperture situated outside the center of gravity may be incorporated in a blank of the respective balancing body in dependence on a magnitude of an initial imbalance of the rotor to be balanced. The defined angular position at which the respective balancing body is mounted on the shaft of the rotor may depend on the orientation of the determined initial imbalance.

The rotor may have positioning sleeves arranged on the shaft to define a distance between the laminated core or the balancing bodies and bearings of the shaft and to provide an anti-rotational safeguard for the balancing bodies.

The rotor according to the invention can be produced within short cycle times with small imbalance.

The balancing bodies on the shaft of the rotor function for balancing the shaft and eliminating the initial imbalance thereof.

The positioning sleeves on the shaft of the rotor function primarily for axially positioning the laminated core and balancing bodies and for rotationally securing the balancing bodies.

The positioning sleeves may be positioned on the shaft of the rotor on both sides of the laminated core to define a distance between the bearings of the shaft and the laminated core or the balancing bodies. The positioning sleeves secure the laminated core and the balancing bodies in their axial position on the shaft at high rotational speeds and correspondingly high centrifugal forces. The positioning sleeves also secure the balancing bodies against rotation. Thus, a small imbalance of the rotor can be ensured even at high rotational speeds.

Each positioning sleeve may have a projection that engages in a cutout of an adjacent or adjoining balancing body. The projection extends in the axial direction into the respective cutout of the adjacent or adjoining balancing body. The anti-rotational safeguard for the balancing bodies on the shaft can thereby be provided in a particularly advantageous manner.

At least one positioning sleeve may define a contact surface of a sliding contact via which an electrical voltage between the rotor and a stator of the electric machine can be decreased. Accordingly, in addition to the spacer function or axial securing function and in addition to the anti-rotational safeguarding function, the respective positioning sleeve performs a further function of decreasing an electrical potential difference and hence electrical voltage between the rotor and the stator of the electric machine that may be formed during operation. For this purpose, the positioning sleeve formed as a contact surface of a sliding contact may be silver-plated on its radial circumferential surface or radial outer side, with the sliding contact sliding along this silver-plated surface.

The invention also relates to a method that comprises providing a rotor is to be balanced for use in an electric machine. The rotor has a shaft and a laminated core arranged on the shaft. The method also includes providing balancing bodies that have an aperture situated outside the center of gravity, mounting the balancing bodies on the shaft in a defined angular position, providing positioning sleeves, and mounting the positioning sleeves on the shaft. The sleeves define a distance between the laminated core or the balancing bodies and bearings of the shaft and provide an anti-rotational safeguard for the balancing bodies. This method enables the rotor of the electric machine to be produced advantageously within short cycle times with small imbalance.

The step of providing the balancing bodies preferably comprises providing blanks having a length that is less than an outside diameter of the laminated core, determining a magnitude and an orientation of an initial imbalance of the rotor to be balanced, and processing the blanks to form the balancing bodies by incorporating the respective aperture situated outside the center of gravity in the respective blank in dependence on the magnitude of the determined initial imbalance. These details also can produce the rotor of the electric machine within short cycle times with small imbalance.

The defined angular position at which the respective balancing body is mounted on the shaft may be dependent on an orientation of the determined initial imbalance. This detail also serves for producing the rotor of the electric machine within short cycle times with small imbalance.

The method also may include determining an axial distance between the bearings of the shaft and determining an axial width of the laminated core. The positioning sleeves are processed depending on the axial distance of the bearings and the axial dimension of the rotor to set the axial dimension of the sleeves. This aspect of the method ensures in a simple manner that the rotor of the electric machine is situated, with respect to the stator thereof, in the correct axial position. In particular performance losses during the operation of the electric machine can be prevented as a result.

BRIEF DESCRIPTION OF THE DRAWINGS

FIGS. 2A, 2B and 2C shows top, end and side views of a positioning sleeve of the rotor according to the invention.

FIGS. 3A and 3B show front and side views of a balancing body of the rotor according to the invention.

DETAILED DESCRIPTION

The invention relates to rotors of electric machines, in particular those rotors of quick-running electric machines that rotate during operation at rotational speeds of more than 15,000 rpm, in particular of more than 17,000 rpm. Such electric machines are used as drive units in high-power vehicles. The invention further relates to a method for producing such rotors of electric machines.

Figure 1:
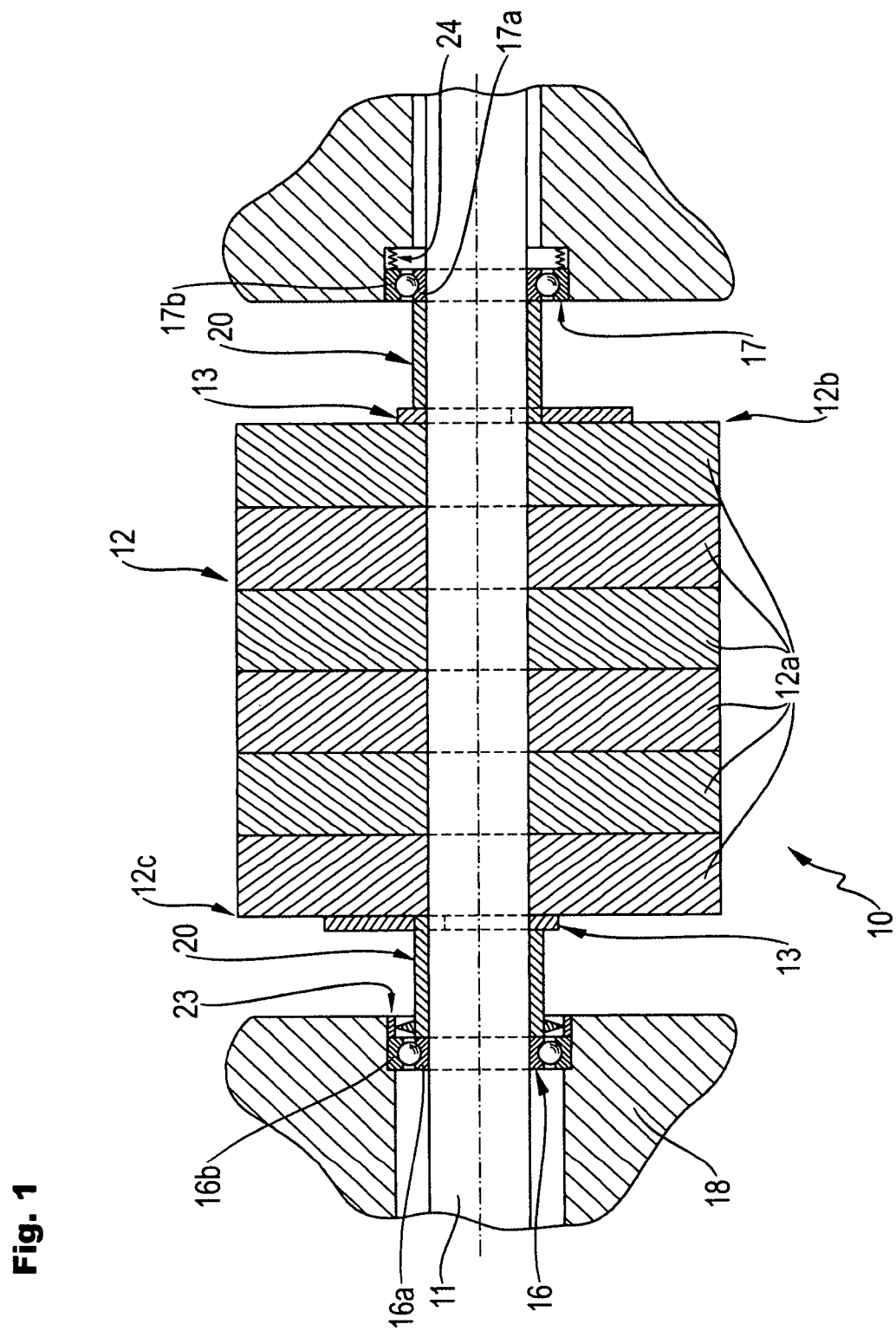
FIG. 1 is a schematic cross section through a rotor according to the invention of an electric machine.

FIG. 1 is a schematic cross section through an electric machine in the region of a rotor 10 of the electric machine. The rotor 10 has a shaft 11 that is mounted to be rotatable via bearings 16, 17 in a housing 18 of a stator of the electric machine. The bearing 16 in FIG. 1 is a fixed bearing, whereas the bearing 17 is a floating bearing.

Each of these two bearings 16, 17 has a shaft-side bearing inner ring 16a, 17a and a housing-side bearing outer ring 16b, 17b. A spring ring 24 adjoins the floating bearing 17 and is supported on the bearing outer ring 17b thereof to allow an axial movement for the floating bearing in the axial direction of the shaft 11.

The rotor 10 of the electric machine further has a laminated core 12 arranged on the shaft 11. The laminated core 12 is composed of laminated core segments 12a that are positioned next to one another or behind one another, as viewed in the axial direction of the shaft 11.

Balancing bodies 13 are arranged on the shaft 11 in addition to the laminated core segments 12a of the laminated core 12. As viewed in the axial direction of the shaft 11, a balancing body 13 is arranged at each axial end 12b, 12c of the laminated core 12, via which balancing body an initial imbalance of the rotor 10 comprising the shaft 11 and the laminated court 12 is eliminated or compensated for. As described in detail below, each of the balancing bodies 13 has an aperture 15 situated outside the center of gravity and incorporated in a blank 13' of the balancing body 13 in dependence of a magnitude of a determined initial imbalance of the rotor to be balanced. The respective balancing body 13 is mounted by way of the respective aperture 15 thereof on the shaft 11 of the rotor 10 to be balanced so that the balancing body 13 comes to bear against the respective outer laminated core segment 12a, and the respective balancing body 13 is mounted on the shaft 11 in an angular position dependent on the orientation of the determined initial imbalance of the rotor to be balanced.

Positioning sleeves 20 also are arranged on the shaft 11 of the rotor 10 of the electric machine. The positioning sleeves 20 are positioned on the shaft 11 of the rotor 10 at both axial ends 12b, 12c of the laminated core 12 to define an axial distance between the bearings 16, 17 and the laminated core 12 or the balancing bodies 13, and to provide an anti-rotational safeguard for the balancing bodies 13.

According to FIG. 1, each of the positioning sleeves 20 has one axial end supported on the bearing inner ring 16a, 17a of the respective bearing 16, 17 and an opposite end supported on the respective balancing body 13.

The positioning sleeves 20 make it possible to set an exact distance between the laminated core 12 and the two bearings 16, 17 so as to set an exact relative position of the rotor 10 in relation to the stator of the electric machine and to avoid performance losses during operation. The positioning sleeves 20 also make it possible to prevent a situation in which, as a result of rotational speeds occurring during operation, and hence centrifugal forces occurring during operation, the laminated core 12 lifts off the shaft 11 and migrates axially along the shaft 11. The positioning sleeves 20 accordingly perform not only a spacer function but also an axial securing function.

Furthermore, the positioning sleeves 20 provide an anti-rotational safeguard for the balancing bodies 13 so that the balancing bodies 13, during operation, always remain positioned with respect to the laminated core 12 in their angular position dependent on the orientation of the determined initial imbalance.

To provide this anti-rotational safeguard for the balancing bodies 13 in a simple reliable manner, the respective positioning sleeve 20 has a projection 21 that engages in a cutout 22 incorporated in the balancing body 13 in the region of the aperture 15.

FIGS. 2A, 2B and 2C show top, end and side views of the positioning sleeve 20. FIGS. 3A and 3B show front and side views of a balancing body 13. FIGS. 2A-2C thus show that the positioning sleeve 20 has the projection 21, which, as viewed in the axial direction of the shaft 11 and as viewed in the axial direction of the positioning sleeve 20, is formed at a defined circumferential position thereof or extends in the axial extension. The cutout 22 is incorporated in the aperture 15 of the balancing body 13. In the mounted state, the positioning sleeve 20 extends by way of its projection 21 into the cutout 22 of the balancing body 13 and thus provides the anti-rotational safeguard.

At least one of the positioning sleeves 20 is formed as a contact surface of a sliding contact 23. FIG. 1 thus shows that the positioning sleeve 20 that is adjacent to the end 12*c* of the laminated core 12 between the end 12*c* of the laminated core 12 and the bearing 16 interacts with the sliding contact 23, which slides along on an outer surface or an outer face of the positioning sleeve 20 during operation. The outer side of this positioning sleeve 20 is preferably silver-plated so that an electrical voltage between the rotor 10 and the stator of the electric machine that is formed during operation can be dissipated or decreased in an advantageous manner via the sliding contact 23 that slides along on the silver-plated surface of the positioning sleeve 20 during operation.

The method according to the invention for producing the rotor 10 will be described in detail below, the balancing of the rotor 10 being part of this method for producing the rotor 10 of the electric machine. This balancing of the rotor 10 can be seen in detail from FIG. 4.

Figure 4:
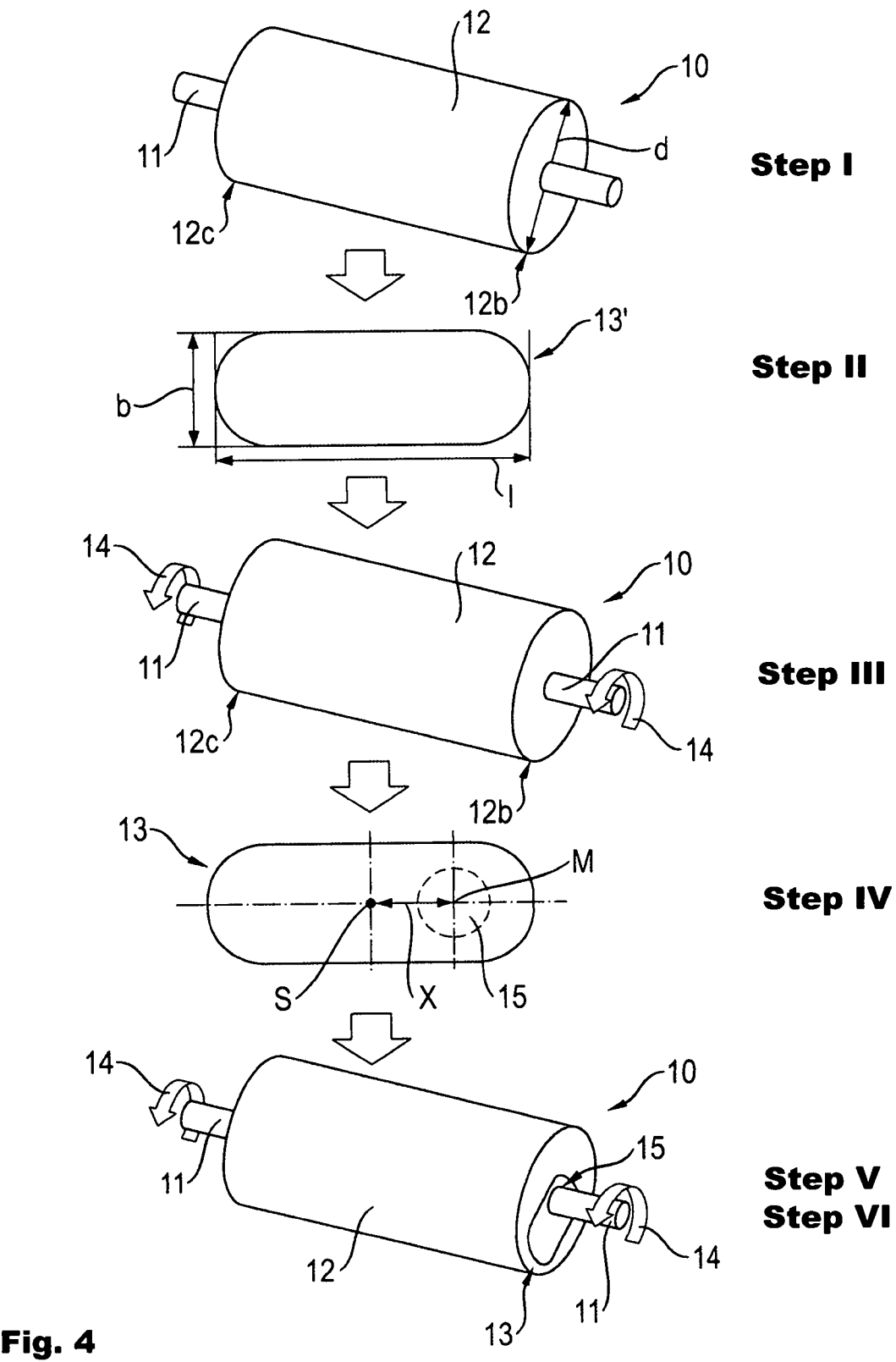
FIG. 4 shows a diagram for illustrating steps for balancing rotors of electric machines.

FIG. 4 shows, with I, II, III, IV, V and VI, different steps when balancing the rotor 10.

In a first step I, a rotor 10 of an electric machine is provided. The rotor 10 is to be balanced and has the shaft 11, and the laminated core 12 is arranged on the shaft 11.

The laminated core 12 has magnet pockets (not shown) in which magnets (not shown either) are accommodated.

In a second step II, blanks 13' for balancing bodies 13 are provided, with such a blank 13' being schematically shown in FIG. 4.

The blank 13' is produced from a paramagnetic and metallic material, for example from paramagnetic steel. The blanks 13' have a length l that is less than an outside diameter d of the laminated core 12 of the rotor 10. A width b of the blanks 13' is less than the length l thereof.

The length l of the blanks 13' is between 60% and 90%, preferably between 60% and 80%, of the outside diameter d of the laminated core 12 of the rotor 10 to be balanced.

A thickness of the blanks 13' is typically between 0.3 mm and 1.0 mm.

An initial unbalance of the rotor 10 to be balanced is determined in a third step III. To determine the initial unbalance of the rotor 10 to be balanced, the rotor 10 is driven to rotate on an imbalance test bench in the direction of the arrows 14. The initial imbalance is determined in respect of its magnitude and its orientation. In each case a magnitude and in each case an orientation of the initial imbalance of the rotor 10 to be balanced is determined with respect to the two axial ends 12*b*, 12*c* of the laminated core 12. Four measured values are preferably present as a result of determining the balance, namely, for the axial end 12*b* of the laminated core 12, a first magnitude and a first orientation, and, for the second end 12*c*, a second magnitude and a second orientation of the initial unbalance of the rotor 10 to be balanced.

In a subsequent fourth step IV, the blanks 13' are processed in dependence on the magnitude of the respective determined initial imbalance. The blanks 13' are processed by virtue of the fact that the aperture 15 situated outside the center of gravity is incorporated, in particular by punching, in the respective blank 13'. The respective balancing body 13 is able to be mounted on the shaft 11 of the rotor 10 to be balanced by way of this circular aperture 15 situated outside the center of gravity. The diameter of the aperture 15 incorporated in the blank 13' during the processing operation in step IV is tailored to the diameter of the shaft 11 of the rotor 10 to be balanced, in particular in such a way that the respective balancing body 13 can be arranged on the shaft 11 of the rotor 10 to be balanced with a defined fit, in particular with a clearance fit.

FIG. 4 shows, in step IV, the center of gravity S of the blank 13' and a center point M of the aperture 15 incorporated in the blank 13' preferably by punching. The distance x between the center of gravity S and the center point M is dependent on the magnitude of the respective determined initial imbalance of the rotor 10 to be balanced. The greater the magnitude of the initial imbalance of the rotor 10 to be balanced, the greater this distance x. The distance x between the center of gravity S and the center point M is determined depending on the magnitude of the respective initial imbalance and, depending thereon, the aperture 15 is incorporated in the respective blank 13', preferably by punching. As already stated, a different magnitude of the initial imbalance can be present in the region of the two ends 12*b*, 12*c* of the laminated core 12 of the rotor 10 to be balanced, with the result that then, for each end 12*b*, 12*c*, an individual aperture 15 having an individual distance x of the center point M of the respective aperture 15 from the center of gravity S of the respective blank 13' is incorporated in the balancing body 13, in the blank 13' thereof, to be positioned at the respective end 12*b*, 12*c*.

Subsequent to the processing of the blanks 13' in step IV in dependence on the magnitude of the respective determined initial imbalance, the processed blanks 13', and hence the balancing bodies 13, are mounted, in a fifth step V, on the rotor 10 to be balanced in an angular position dependent on the orientation of the determined initial imbalance. Since not only the respective magnitude of the initial imbalance but also the respective orientation of the initial imbalance can be different at both axial ends 12*b*, 12*c*, the respective balancing body 13 can be mounted in an individual angular position on the rotor 10 to be balanced in the region of each axial end 12*b*, 12*c*.

The balancing bodies 13 are mounted at the axial ends 12*b*, 12*c* of the laminated core 12 of the rotor 10 to be balanced by plugging the balancing bodies 13 by way of their respective aperture 15 onto the shaft 11 at the respective end of the rotor 10.

In a further step VI, the result of the balancing can optionally be checked with a repeated balancing run analogously to step III, but with balancing bodies 13 mounted.

The positioning sleeves 20 are provided subsequent to mounting the balancing bodies 13 on the shaft 11 of the rotor 10 and are mounted on the shaft 11. The positioning sleeves 20 define the distance between the laminated core 12 or the balancing bodies 13 and the bearings 16, 17 of the shaft 11, and further provide the anti-rotational safeguard for the balancing bodies 13. The positioning sleeves 20 are oriented and mounted on the shaft 11 in such a way that the projections 21 thereof project axially into the slot-like cutouts 22 of the balancing bodies 13 to provide the anti-rotational safeguard. The positioning sleeves 20 are here preferably shrink-fitted or pressed onto the shaft 11 in order to secure the sleeves in their position on the shaft 11.

According to an advantageous development, there is provision that both an axial distance between the bearings 16, 17 and an axial dimension of the rotor 10, in particular an axial width of the laminated core 12, are determined. The positioning sleeves 20 can then be processed depending on the axial distance separating the bearings 16, 17 and depending on the axial dimension of the rotor 10 to set the axial length of the sleeves and thus ultimately to orient or position the rotor 10 exactly with respect to the stator of the electric machine.

This processing of the positioning sleeves 20 preferably is performed by grinding at the end thereof at which said sleeves do not have the projections 21.

The invention accordingly proposes a rotor 10 of an electric machine and a method for producing same, wherein the rotor 10 comprises balancing bodies 13 in order to compensate for the initial imbalance of the rotor 10. These balancing bodies 13 are elements in which the aperture 15 situated outside the center of gravity is incorporated depending on the initial imbalance of the rotor 10, by way of which aperture the respective balancing body 13 is then threaded onto the shaft 11. An individually processed balancing body 13 is mounted at each axial end 12*b*, 12*c* of the laminated core 12 of the rotor 10 to be balanced, to be precise in a defined angular position depending on the respective orientation of the initial imbalance. The positioning sleeves 20 secure the respective balancing body 13 in this defined angular position against unintended rotation.

The invention is used in rotors of electric machines that rotate at a high rotational speed of more than 15,000 rpm, in particular more than 17,000 rpm. The rotor can be produced with a small weight and small axial dimension within short cycle times with small imbalance. A shaft shoulder is not required on the shaft.

What is claimed is:

1. A rotor of an electric machine, comprising:
   a shaft,
   a laminated core arranged on the shaft,
   balancing bodies arranged on the shaft, each of the balancing bodies having an aperture situated outside the center of gravity, and each of the respective balancing body being mounted by way of the aperture on the shaft of the rotor in a defined angular position, each of the balancing bodies having a cutout extending out from the aperture, and
   positioning sleeves arranged on the shaft to define a distance between bearings of the shaft and the laminated core or the balancing bodies, each of the positioning sleeves having a projection projecting radially out at an end of the respective positioning sleeve opposite the respective bearing and extending axially into engagement in the cutout of the respective balancing body to provide an anti-rotational safeguard for the balancing bodies.

2. The rotor of claim 1, wherein:
   the aperture of the respective balancing body that is situated outside the center of gravity is incorporated in a blank of the balancing body in dependence on a magnitude of an initial imbalance of the rotor to be balanced, and
   the defined angular position at which the respective balancing body is mounted on the shaft is dependent on the orientation of the determined initial imbalance.

3. The rotor of claim 1, wherein
   as viewed in the axial direction of the shaft, in each case at least one balancing body and in each case one positioning sleeve are arranged on the shaft at each axial end of the laminated core, and
   the positioning sleeve is arranged between a bearing inner ring of the respective bearing and the balancing body on the respective side.

4. A rotor of an electric machine, comprising:
   a shaft,
   a laminated core arranged on the shaft,
   balancing bodies arranged on the shaft, each of the balancing bodies having an aperture situated outside the center of gravity, and each of the respective balancing body being mounted by way of the aperture on the shaft of the rotor in a defined angular position, and
   positioning sleeves arranged on the shaft to define a distance between bearings of the shaft and the laminated core or the balancing bodies and to provide an anti-rotational safeguard for the balancing bodies, wherein at least one of the positioning sleeves defines a contact surface of a sliding contact via which an electrical voltage between the rotor and a stator of the electric machine can be decreased.

5. A method for producing a rotor of an electric machine, comprising:
   providing a rotor, which is to be balanced, of an electric machine, the rotor having a shaft with opposite ends engaged in bearings and one or more laminated cores arranged on the shaft at positions spaced from the bearings,
   providing balancing bodies each of which has an aperture situated outside a center of gravity, each of the balancing bodies having a cutout extending out from the aperture,
   mounting the balancing bodies on the shaft in a defined angular position and adjacent the laminated core,
   providing positioning sleeves, each of the positioning sleeves having a projection projecting radially out at one end of the respective positioning sleeve,
   mounting the positioning sleeves on the shaft so that the projection of each of the positioning sleeves is engaged in the cutout of the respective balancing body, and
   securing the positioning sleeves rotationally on the shaft, wherein the positioning sleeves define a distance between the laminated core or the balancing bodies and bearings of the shaft and engagement of the projection of each of the positioning sleeves in the cutout of the respective balancing body provides an anti-rotational safeguard for the balancing bodies.

6. The method of claim 5, providing the balancing bodies comprises:
   providing blanks having a length that is less than an outside diameter of the laminated core,
   determining a magnitude and an orientation of an initial imbalance of the rotor to be balanced,
   processing the blanks to form the balancing bodies by incorporating the respective aperture situated outside the center of gravity in the respective blank in dependence on the magnitude of the determined initial unbalance.

7. The method of claim 6, wherein the defined angular position at which the respective balancing body is mounted on the shaft is dependent on an orientation of the determined initial imbalance.

8. The method of claim 7, wherein
   in each case a magnitude and in each case an orientation of the initial imbalance of the rotor to be balanced is determined with respect to the two axial ends of the laminated core, and
   in each case a blank is processed for each axial end depending on the respective magnitude of the initial imbalance, and the respective balancing body is mounted individually depending on the orientation of the initial imbalance.

9. The method of claim 5, wherein securing the positioning sleeve rotationally on the shaft includes shrink-fitting the positioning sleeves onto the shaft.

10. The method of claim 5, further comprising:
   determining an axial distance between the bearings;
   determining an axial width of the laminated core, and
   processing the positioning sleeves depending on the axial distance of the bearings and the axial dimension of the rotor to set the axial dimension of the sleeves.

11. The method of claim 5, wherein securing the positioning sleeve rotationally on the shaft includes causing one of the positioning sleeves to be in sliding contact with one of the bearings and thereby decreasing an electrical voltage between the rotor and a stator of the electric machine.

12. The method of claim 5, wherein securing the positioning sleeve rotationally on the shaft includes press-fitting the positioning sleeves onto the shaft.

\* \* \* \* \*